March 8, 1949.  H. ROSE  2,463,908
HEATING APPARATUS

Filed Sept. 28, 1942  8 Sheets-Sheet 1

Inventor:
Harry Rose
By Williams, Bradbury & Hinkle
Attorneys.

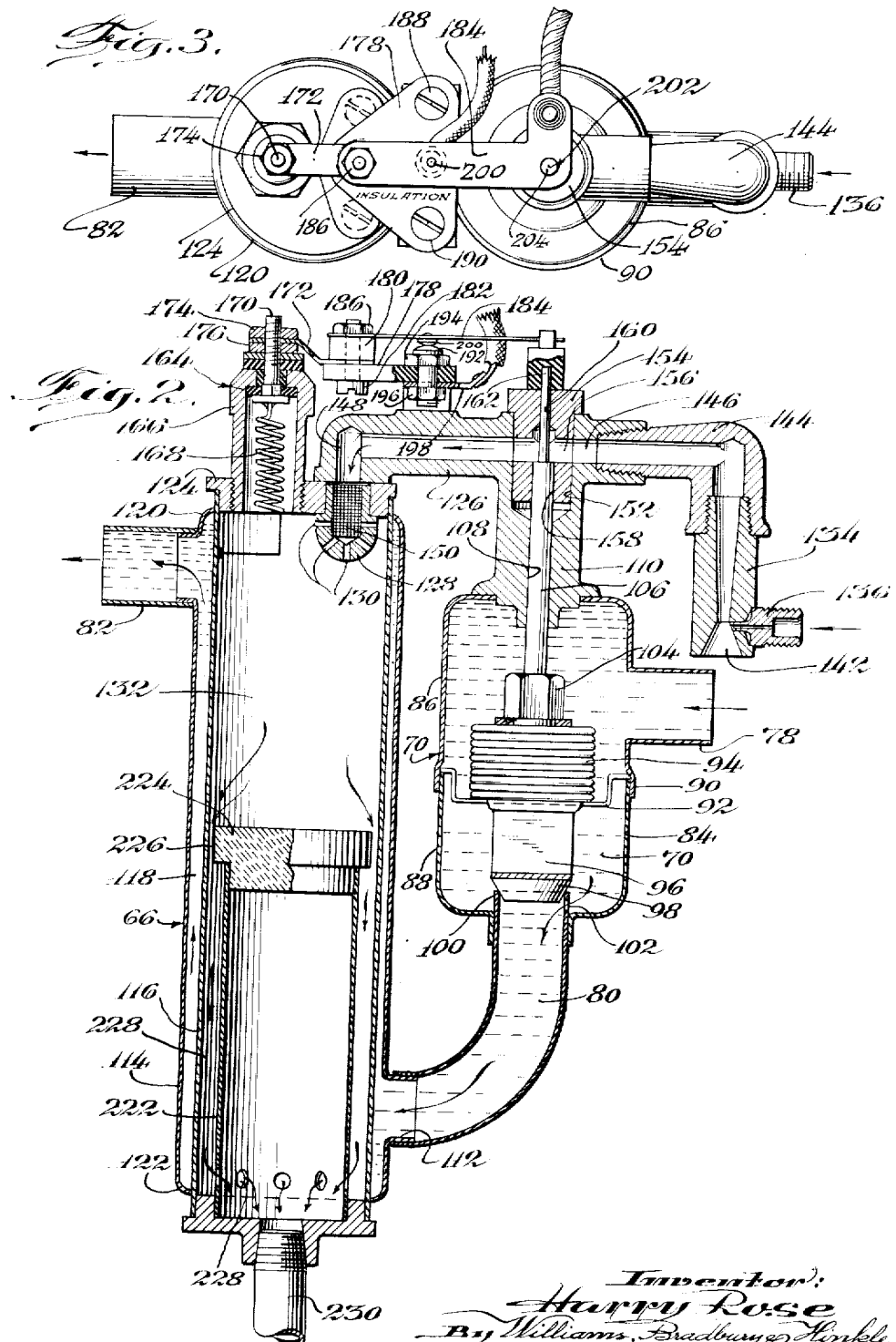

March 8, 1949.  H. ROSE  2,463,908
HEATING APPARATUS
Filed Sept. 28, 1942　　8 Sheets-Sheet 3
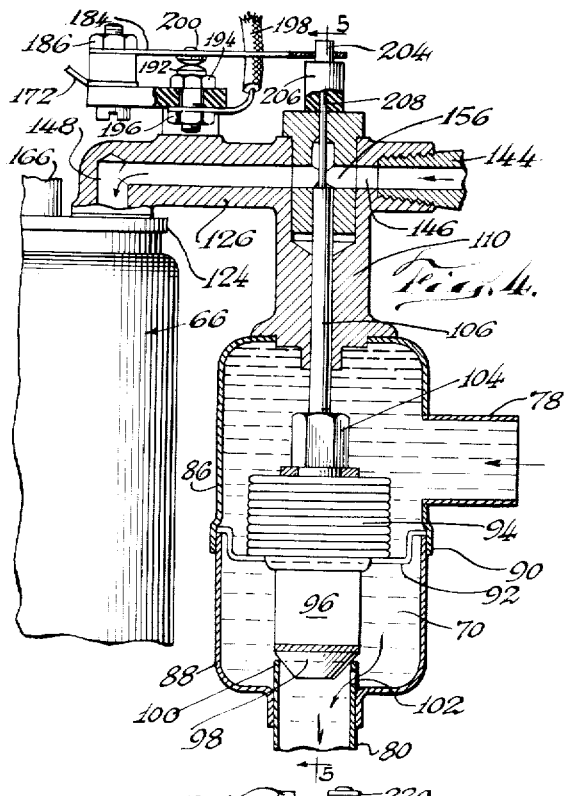
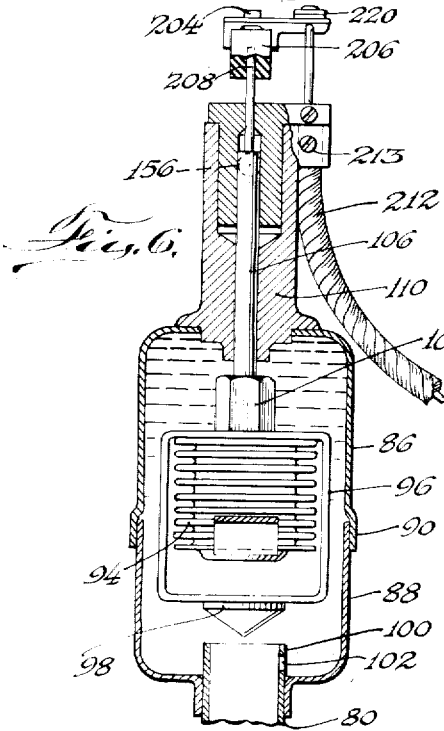
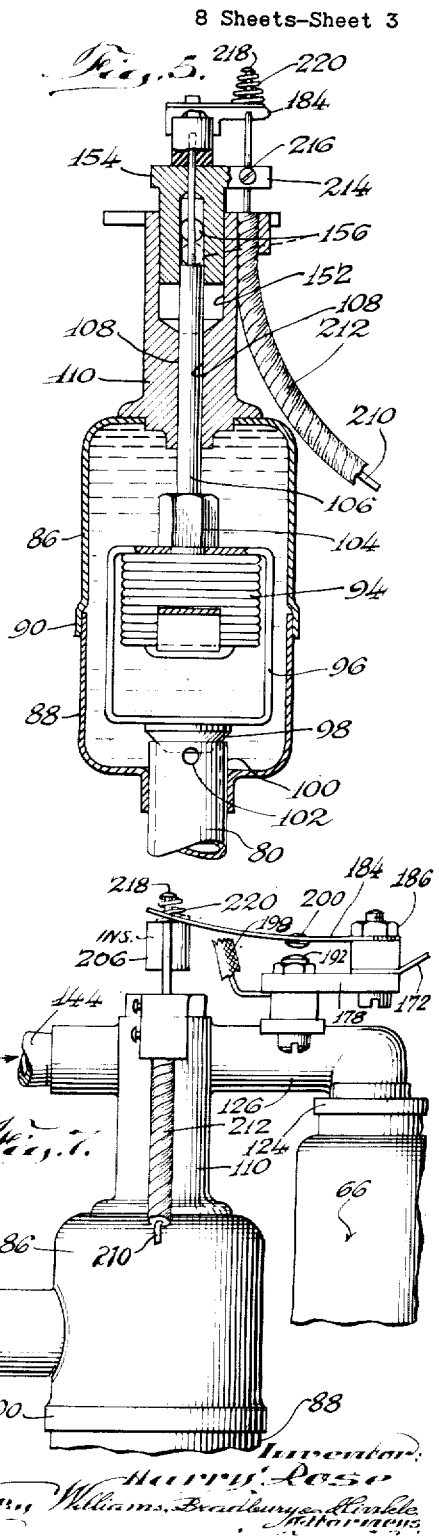
Inventor:
Harry Rose
By Williams, Bradbury & Hinkle
Attorneys

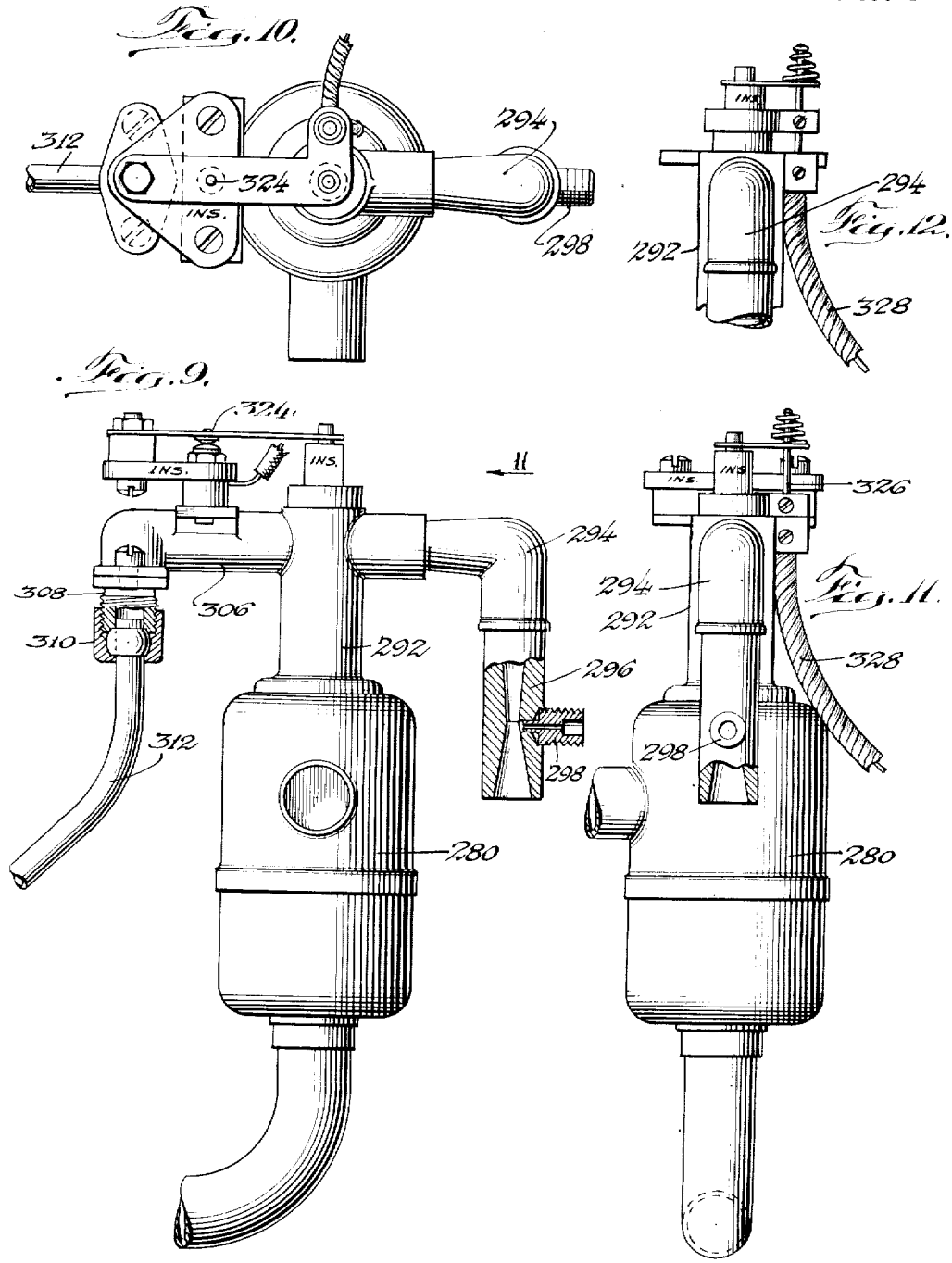

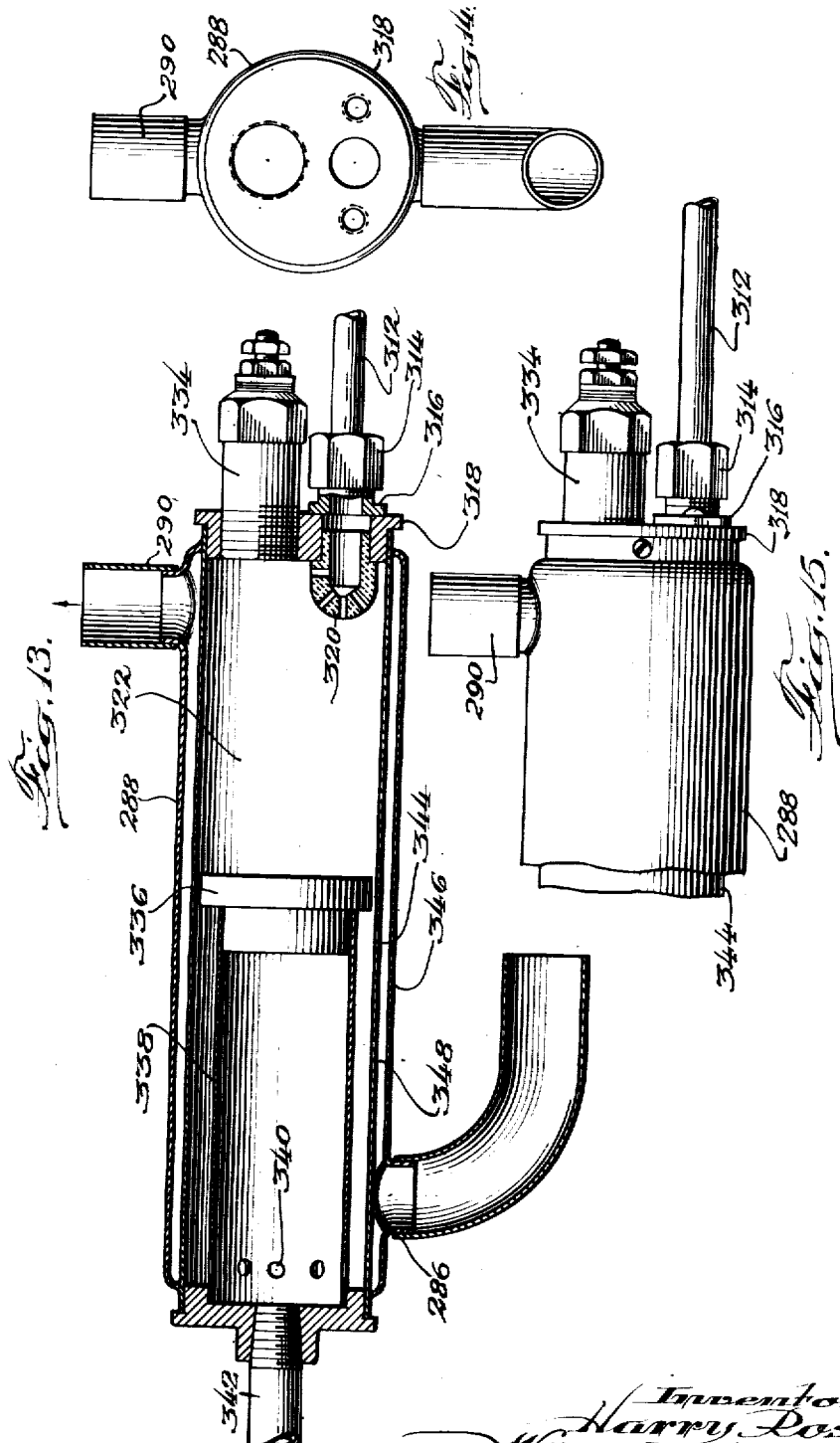

March 8, 1949.     H. ROSE     2,463,908
HEATING APPARATUS
Filed Sept. 28, 1942     8 Sheets-Sheet 6
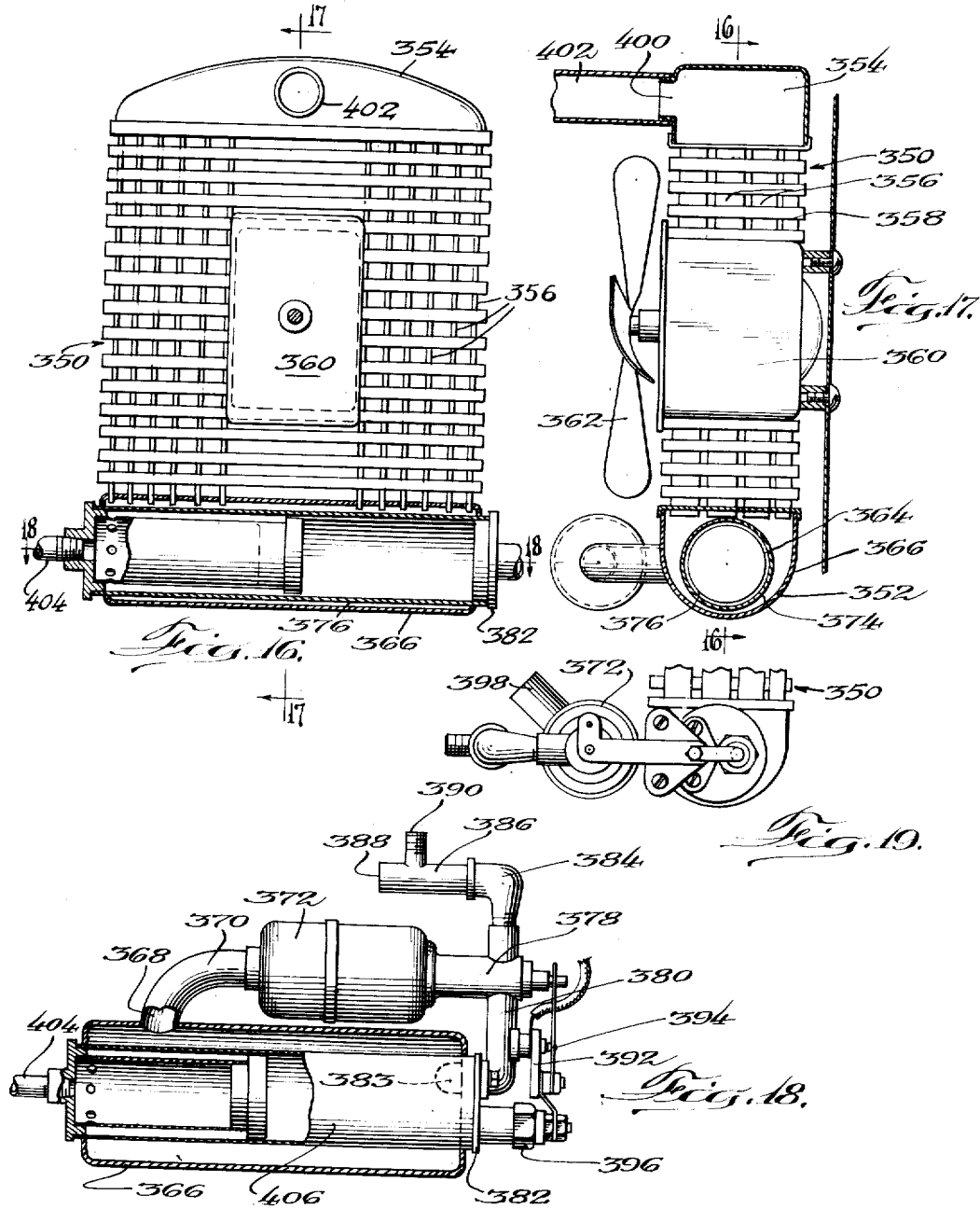
Inventor:
Harry Rose
By Williams, Bradbury & Hinkle
Attorneys March 8, 1949.  H. ROSE  2,463,908
HEATING APPARATUS
Filed Sept. 28, 1942  8 Sheets-Sheet 7

Inventor:
Harry Rose
By Williams, Bradbury & Henkle
Attorneys

March 8, 1949.  H. ROSE  2,463,908
HEATING APPARATUS
Filed Sept. 28, 1942  8 Sheets-Sheet 8

Inventor:
Harry Rose
By Williams, Bradbury & Hinkle
Attorneys.

Patented Mar. 8, 1949

2,463,908

UNITED STATES PATENT OFFICE 2,463,908

HEATING APPARATUS

Harry Rose, Three Rivers, Mich., assignor, by mesne assignments, to Edward J. Rose, Wilmington, Ohio Application September 28, 1942, Serial No. 459,895

8 Claims. (Cl. 237—8)

My invention relates to heating apparatus and is more particularly concerned with, but is not limited to, heating apparatus for automobiles and similar vehicles.

In present automotive practice, it is common to provide a hot water heater for heating the passenger compartment of the vehicle. Such hot water heater is connected to the engine cooling system and receives a supply of hot water from the water jacket of the gasoline engine which drives the automobile. In some installations, only a single heater is used to heat the entire passenger compartment, whereas in other installations two or more heaters are used for this purpose.

Where the hot water heater is mounted on the dashboard which separates the engine compartment from the passenger compartment, it is also common to provide defroster outlets leading to the automobile windshield and through which air heated by the heater is driven by an electric fan and is directed against the windshield to melt any ice or snow which may tend to collect thereon. Instead of mounting the main heater on the dashboard, this heater is frequently located beneath the front seat of a passenger automobile and in such installations it is common to provide an auxiliary heater on the dashboard to provide the heated air necessary to defrost the windshield. Various other arrangements of hot water heaters are provided for modern automobiles and in busses several heaters may be used and located at different points in the passenger space to provide substantially uniform heating of all parts of this space.

In all of the foregoing arrangements, the individual heating unit or units do not supply heat until the temperature of the water in the water jacket of the engine has been raised by the operation of the automobile engine. Where the automobile has been standing in the open or in an unheated garage for an appreciable length of time in cold weather, the water in the engine cooling system is at a low temperature and several minutes are required to bring the cooling water to a sufficiently high temperature to enable the heating units to function. Most automobile cooling systems are provided with thermostatic controls which prevent the cooling water or most of it from circulating through the automobile radiator until the temperature of the water in the water jacket has attained a predetermined minimum temperature. The presence of the thermostatic control shortens the time required to bring the automobile engine to normal operating condition and also the time required to raise the water in the heating units to a sufficiently high temperature to permit these units to give off heat. However, with the best present installations, a very appreciable period of time is required to enable the hot water heating units to start supplying heat when the automobile and its cooling system are thoroughly chilled at the time the engine is started.

An object of my invention is to provide pre-heating apparatus which can be applied to existing automobiles having hot water heating units installed therein and which will materially shorten the time required to bring the water in the heating units to a sufficiently high temperature to enable the heating units to give off heat.

Another object of my invention is to provide pre-heating apparatus which can be installed in various arrangements on existing automobiles and which can be used with any type of hot water heating unit.

Another object of my invention is to provide pre-heating apparatus which is inexpensive to manufacture and install and which requires a minimum of changes in the existing heater installation on the automobile.

Another object of my invention is to embody my pre-heating apparatus in the form of an accessory so designed that a few sizes or variations will fit most of the hot water heater installations now in use on automobiles.

Another object of my invention is to provide new and improved pre-heating apparatus to use the gasoline supply for the automobile engine as the source of supply for a burner which raises the temperature of the water in the heating unit before the water in the jacket of the engine attains a temperature sufficiently high to satisfy the needs of the heating unit.

Another object of my invention is to provide a pre-heating apparatus which is more efficient than anything known to the prior art.

Another object of my invention is to provide a pre-heating apparatus having an improved burner.

Another object of my invention is to provide a pre-heating apparatus having an improved automatic control.

Another object of my invention is to provide a pre-heating apparatus having an improved combination manual and automatic control.

Another object of my invention is to provide a heating apparatus having control mechanism which is responsive to the pressure created in a boiler forming part of the heating apparatus.

Another object of my invention is to provide heating apparatus having improved automatic control means responsive to the temperature of the water supplied from the engine water jacket.

Another object of my invention is to provide pre-heating apparatus which may be placed in either a vertical or a horizontal position or wherein parts may be placed vertically and other parts horizontally in the same installation.

Another object of my invention is to provide improved means for pre-heating a part of the cooling medium and for supplying this pre-heated part to the individual heating units or unit.

Another object of my invention is to provide an improved burner of general application.

Another object of my invention is to provide an improved baffle for a burner.

Another object of my invention is to provide a self-contained heating unit of improved construction which may be utilized to heat the interior of the passenger compartment of a vehicle or which may be utilized to heat any other enclosed space.

Other objects and advantages of my invention will become apparent as the description proceeds.

In the accompanying drawings:

Fig. 2 is a vertical section through the burner and control chamber of Fig. 1;

Fig. 3 is a top plan view of the burner and control chamber of Fig. 2;

Fig. 4 is a vertical section through the control chamber and associated mechanism showing the position of the parts when the burner is in operation;

Fig. 5 is a vertical section of the control chamber and associated mechanism taken on the line 5—5 of Fig. 4 and showing the position assumed by the parts when the manual control is in the off position;

Fig. 6 is a view similar to Fig. 5 but showing the position of the parts when the automatic control is in the off position;

Fig. 7 is a side elevation of the control chamber and associated mechanism showing the parts in the positions assumed in Fig. 6;

Fig. 9 is a side elevation of the control chamber and associated mechanism of Fig. 8;

Fig. 10 is a top plan view of the apparatus shown in Fig. 9;

Fig. 11 is an end view of the apparatus of Fig. 9 looking in the direction of the arrow 11;

Fig. 12 is a partial view looking in the same direction as Fig. 11 but showing the position of the parts when the manual control is in the off position;

Fig. 13 is a longitudinal sectional view of the burner of Fig. 8 taken on line 13—13 but with the water outlet differently positioned;

Fig. 14 is an end view of the burner of Fig. 13;

Fig. 15 is an elevational view of the righthand portion of the burner of Fig. 13;

Fig. 16 is a vertical sectional view taken on the line 16—16 of Fig. 17 showing a modified heating unit which can be used in lieu of the heating units of Figs. 1 and 8;

Fig. 17 is a vertical sectional view taken on the line 17—17 of Fig. 16;

Fig. 18 is a sectional view taken on line 18—18 of Fig. 16;

Fig. 19 is an end view of Fig. 18;

Figure 1:
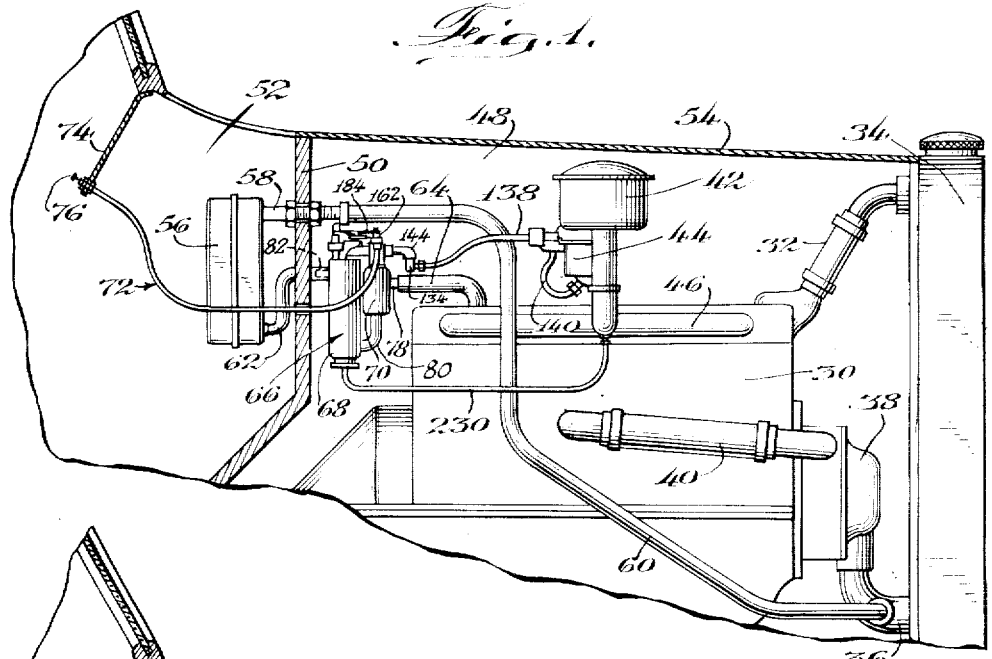
Fig. 1 is a view illustrating an installation in a conventional automobile of a preferred form of my invention.

Figs. 1 to 7, inclusive, disclose an embodiment of my invention as being applied to an automobile having an engine 30 connected by hose 32 to the top of a radiator 34 having a lower connection 36 leading to a water pump 38 which returns the water from the bottom of the radiator through pipe 40 to the water jacket of the engine 30. The engine 30 has an air intake 42 through which air is supplied to a carburetor 44 which furnishes a mixture of fuel and air to the intake manifold 46. The engine 30 is located in an engine compartment 48 separated from the passenger compartment 52 by a dash 50. The engine compartment 48 is preferably provided with a conventional hood 54 which may be opened to permit inspection and repair of the mechanism in the engine compartment.

A heating unit 56 is mounted in the passenger compartment 52 and is illustrated as being attached to the dash 50 by means of a pipe 58. The pipe 58 constitutes a return for the fluid circulated through the heater 56 and is connected to the inlet side of the water pump 38 by a pipe 60. The heating unit 56 has a hot water inlet pipe 62 and in the conventional automobile installation the hot water is supplied to the inlet pipe 62 directly from a pipe 64 which is attached to the top of the motor block of the engine 30.

The parts thus far described are conventional parts such as may be found in a wide variety of hot water heater installations on automobiles and require no detailed description. The pipe 32 which connects the cooling jacket of the engine 30 with the top of the radiator 34 may be provided with the usual thermostat to restrict or completely cut off flow between the engine water jacket and the radiator 34 until the water in the jacket reaches a predetermined temperature.

In the embodiment of my invention illustrated in Fig. 1, I interpose a pre-heating unit 66 between the pipes 62 and 64 through which water is supplied to the heating unit 56. This pre-heating apparatus comprises in general a burner 68, a control chamber 70, and associated control mechanism including a Bowden wire 72 leading to the instrument board 74 to permit manual control of the heating apparatus by manipulation of button 76.

The control chamber and burner are shown in Fig. 2 and the associated controls are shown most clearly in this figure and in Figs. 3, 4, 5, 6, and 7, wherein these controls are shown in the several different positions which they assume under different conditions. The control chamber 70 has an inlet 78 which is connected to the pipe 64 whereby water from the engine water jacket is supplied to this control chamber. The outlet pipe 80 of the control chamber 70 leads to the bottom of the heater 66 and the top of this burner is provided with an outlet 82 which is connected to the pipe 62 leading to the bottom of the heating unit 56.

The control chamber 70 is illustrated as having a shell 84 formed by a pair of sheet metal cups 86 and 88 which are telescoped as indicated at 90. A strap 92 has its ends clamped between the cups 86 and 88 of the shell 84 and forms a support for the lower end of a control bellows or Sylphon 94 which is seated in a saddle shaped depression in the strap 92.

The bellows 94 is responsive to the temperature of the water in the control chamber 70 and is so constituted that this bellows expands when the temperature of the water in the shell 84 increases, and contracts when the temperature of this water decreases. While I have found that the bellows or Sylphon 94 is particularly advantageous for my purpose, other thermostatic control means could be used in lieu thereof.

A rectangular frame 96 is located in the control chamber 70 and has its top resting on the upper end of the bellows or Sylphon 94. The frame 96 has open sides and lies in a plane perpendicular to the plane of the supporting strap 92 which carries the bellows 94. Tapered valve 98 is attached to the lower end of the frame 96 and coacts with the inwardly projecting upper end 100 of pipe 80 to regulate communication between this pipe and the interior of the control chamber 70. The end 100 of the pipe 80 is provided with a small orifice 102 which at all times provides restricted communication between the pipe 80 and the control chamber 70. This orifice 102 may be of any suitable size, for example, one-eighth of an inch, and permits a slow flow of water through the control chamber 70 when the valve 98 is in closed position.

A nut 104 is attached to the top of the frame 96 and is threaded or otherwise secured to the lower end of a control rod 106 which slides in the bore 108 of a control head 110 attached to the cup 86 of the shell 84. The control rod 106 moves up and down as the bellows 94 expands and contracts and thereby regulates the operation of the burner 66 in a manner which I shall presently describe.

The lower end of pipe 80 is telescoped over an inlet nipple 112 which is illustrated as being an integral part of the sheet metal outer wall 114 of the heater 66. An inner wall 116, also of sheet metal, is spaced from the outer wall 114 to provide a water jacket 118 therebetween. The upper and lower ends of the outer wall 114 are bent inwardly as indicated at 120 and 122, respectively, to form a sealing engagement with the inner wall 116. Water entering the burner inlet 112 flows upwardly through the water jacket 118 formed between walls 114 and 116 and passes out of burner outlet 82 to pipe 62.

The upper end of inner wall 116 is closed by a heating chamber head 124 which is attached to the tubular arm 126 of the control head 110. A burner head 128 is mounted in chamber head 124 and has openings 130 through which a combustible mixture is supplied to the combustion chamber 132 provided by the upper part of the inner wall 116. I shall now describe the means for supplying a combustible mixture to the burner head 128.

The burner head 128 is supplied with a mixture of air and gasoline by a carburetor 134 which is illustrated as being of the fixed type but which may be provided with any suitable fuel or air adjustment if desired. The carburetor 134 is provided with a fuel inlet nipple 136 connected by pipes 138 and 140 to the float bowl of the engine carburetor 44. Carburetor 134 is supplied with air through an air inlet 142.

A tubular elbow 144 connects the carburetor 134 with bore 146 extending transversely of the control head 110 and its integral arm 126. A second bore 148 connects bore 146 with the interior of the burner head 128. A flame arrestor 150 is located in the burner head 128 and preferably consists of a wire gauze of suitable mesh.

The control head 110 has a cylindrical recess 152 containing a manual control valve 154 which is axially slidable therein. This control valve has a bore 156 which, in the position shown in Fig. 2, is in line with the bore 146 to provide communication between the carburetor 134 and the burner 128. The control valve 154 also has a large axial bore 158 and a smaller axial bore 160 which forms a continuation of the bore 158.

In the position of the parts shown in Fig. 2, the control rod 106 extends into the bore 158 of valve 154 and has its upper end just below the cross bore 156 formed in this valve. A pin 162 is in line with the upper end of control rod 106 and is attached to a control block hereinafter described. This pin 162 is of smaller diameter than control rod 106. In Fig. 2, the pin 162 is illustrated as being located in the bore 160 and as having its lower end located in the intersection of bores 156 and 158 in the valve member 154. Pin 162 is of such diameter that it does not prevent passage of combustible mixture through bore 156 to burner head 128.

The combustible mixture admitted to the combustion chamber 132 through the openings 130 in burner head 128 is ignited by an electric igniter 164 attached to the chamber head 124. This igniter comprises a metal tube 166 which is threaded at its lower end into the head 124 and thereby grounded to the frame of the automobile. A resistance wire 168 is located in the tube 166 and has its lower end grounded to the open lower end of this tube.

The upper end of the wire 168 is attached to a threaded terminal 170 which is insulated from the tube 166 but is attached to a lead 172 by nuts 174 and 176 which serve to clamp one end of the lead 172 to the terminal 170. The other end of the lead 172 is attached to an insulated block 178 by nut 180 and screw 182. A flexible switch blade 184 is attached to the screw 182 by a nut 186 and is in electrical communication with lead 172 through screw 182.

The insulated block 178 is of triangular shape as best shown in Fig. 3 and is attached to the arm 126 of control head 110 by screws 188 and 190 or by any other suitable means. This block 178 carries a switch contact 192 which is shown as constituting the upper end of a screw secured to the block 178 by nuts 194 and 196. The nut 196 also forms an attaching means for one end of a wire 198 leading to the hot or ungrounded side of the usual automobile battery. The contact 192 cooperates with a contact 200 carried by switch blade 184 and the supply of current to the igniter is controlled by opening and closing these contacts. I shall now describe the automatic and manual means for controlling this igniter switch.

The switch blade 184 is L-shaped, as shown in Fig. 3, and has an opening 202 which surrounds the upstanding finger 204 of a switch actuating block 206 formed of insulating material. The block 206 has a vertical bore 208 in which the upper end of pin 162 is located. When the parts are in the position shown in Figs. 2 and 4, the switch is closed, but when the bellows 94 expands, pin 162 lifts actuating block 206 thereby flexing switch blade 184 and moving contact 200 out of engagement with contact 192.

The separation of these contacts cuts off the supply of current to the igniter. This position of the parts is shown in Figs. 6 and 7. When the bellows 94 expands to open the igniter switch, the upper end of control rod 108 moves upwardly across passage 156 in valve 154 and cuts off the supply of combustible mixture to the burner. The supply of current for the igniter and the supply of combustible mixture for the burner are thus cut off substantially simultaneously and the burner ceases to function as a means for heating the water supplied to the heating unit or units.

I also provide manual means for controlling the operation of the burner. I have previously referred to the Bowden wire indicated generally by the numeral 72 and the control button 76 adjacent the dashboard 74. The button 76 is attached to one end of a cable 210 which passes through and slides in a flexible conduit 212 having one end attached to the dash 74 and the other end attached to the control head 110 by screw 213. An arm 214 on control valve 154 is attached by screw 216 to cable 210 so that pushing inwardly on the button 76 raises valve 154 from the position shown in Fig. 4 to the position shown in Fig. 5. In the latter position, the passage 156 is out of alignment with the bore 146 in the control head and this bore is closed by the lower end of valve 154, thus cutting off the supply of combustible mixture to the burner.

When valve 154 is raised to the position shown in Fig. 5, the switch actuating block 206 is also raised and flexes switch blade 184 to move contact 200 out of engagement with contact 192. This cuts off the supply of current to the igniter 164. The manual control is, therefore, able to render the burner 66 inoperative and this manual control is independent of the automatic control.

As best shown in Fig. 5, the cable 210 passes through a hole in switch blade 184 and has a head 218 forming a seat for a spring 220 confined between this head and the switch blade 184. This spring serves to urge the switch blade 184 and its contact 200 into engagement with contact 192 when the parts are in the position shown in Figs. 2 and 4. When the automatic control operates to shut off the burner, the spring 220 is further compressed, as indicated in Figs. 6 and 7.

Referring to Fig. 2, it will be seen that the burner includes a tube 222 forming a support for a ceramic heat retainer and diffuser 224 which defines the lower limit of the combustion chamber. The gases from the combustion chamber pass through the narrow annular passage 226 formed between the retainer 224 and the wall 116 and thence flow downwardly in the annular space 229 formed between this wall and the tube 222. The lower end of the tube 222 is provided with openings 228 through which the burned gases are discharged to a pipe 230 leading to the intake manifold 46 of the engine 30.

The burning gases in the combustion chamber 132 and the hot gases flowing therefrom through annular spaces 226 and 228 give up their heat to the water in the water jacket 118 and thus raise the temperature of this water to the temperature most desirable for proper operation of the heating unit 56. While the burner is operating, the valve 98 is in closed position and only the slow flow of water permitted by restriction 102 occurs in water jacket 118 and heating unit 56. The gases sucked into the intake manifold have been cooled sufficiently so that they do not tend to ignite the combustible mixture supplied to this manifold by the engine carburetor 44 nor do they heat or dilute this mixture sufficiently to interfere with the engine operation.

The operation of that form of my invention shown in Figs. 1 to 7 is as follows. When the water in the engine water jacket is cold, bellows 94 is collapsed and valve 98 is closed. If the manual control button 76 is pulled out to the on position, the parts are in the position shown in Figs. 2 and 4. When the automobile engine is started, the suction in the intake manifold will create a suction in the burner which will draw a combustible mixture through the openings 130 in burner tube 128. Current will be supplied to the igniter 166 and cause resistance wire 168 to attain a high temperature which will ignite the combustible mixture in the combustion chamber 132.

The heat created in the combustion chamber and the heat of the gases flowing therefrom down the inner surface of inner wall 116 will heat the water in the water jacket 118. The engine water pump will create only a slow flow through the control chamber 70, burner jacket 118, and heating unit 56 due to the closed position of the valve 98. Hot water is quickly supplied to the heating unit 56 and this unit thereupon immediately starts to heat the passenger compartment of the automobile. Because of the slow flow through the jacket 118, only a relatively small amount of water is heated by the burner during its period of operation and this feature contributes to the efficiency and economy of my pre-heating apparatus.

It will be understood that the heating unit 56 may be of any suitable type. In accordance with conventional practice, this heating unit will usually be provided with a small electric fan for circulating air over the fins of the heating unit. Any suitable control may be provided for this fan and adjustable louvres may be provided for directing the heated air discharged thereby in any desired direction.

The burner may be started either simultaneously with the starting of the automobile engine or immediately after the automobile engine has been started. I preferably make the burner of such size that it will supply water at high temperature to the heating unit 56 within a few seconds after the burner has been started. In a preferred embodiment of my invention, the heating unit will give off large quantities of heat within a minute or two after my pre-heating apparatus has been placed in operation. The exact time required to bring the heating unit to full operating temperature will, of course, vary slightly with the temperature of the water in the engine cooling system, but I have found that the time required should not exceed a minute and a half or two minutes even under the most severe conditions.

After the automobile engine has been operating for some little time, the water in the engine water jacket 30 heats up and the slow flow from the engine water jacket through the control chamber 70 causes the water in this control chamber to reflect the temperature of the water in the engine cooling system. When the water in the engine water jacket attains a sufficiently high temperature to supply the requirements of the heating unit 56, the bellows 94 expands to open the valve 98 and permit free flow of water from the engine water jacket through control chamber 70, burner jacket 118, and heating unit 56.

The expansion of bellows 94 moves control rod 108 upwardly to close passage 156 and thereby cut off the supply of combustible mixture to the burner 66. Pin 162 attached to the upper end of control rod 108 also moves upwardly and lifts switch actuating block 206. This flexes switch blade 184 and moves switch contact 200 out of engagement with contact 192 to cut off the supply of current to the igniter 168. The burner is now completely out of operation and no additional heat is supplied to the cooling water by my pre-heating apparatus. All heat supplied to the heating unit 56 is derived from the automobile engine 30 and this condition will normally continue throughout the period of operation of the automobile.

If for any reason the water flowing into the control chamber 70 from the engine water jacket should drop below the required temperature, bellows 94 would again contract thereby closing valve 98 and restarting my pre-heating burner. If the automobile engine is stopped without shifting the manual control button 96 to off position, no injury will result. As the water in the control chamber 70 cools down, bellows 94 will contract and return the parts to the position shown in Fig. 2. This will close valve 98 and the igniter switch, and will open communication between burner tube 128 and carburetor 134. No combustible mixture will be supplied to the burner, however, since the automobile engine is not operating and there is no suction available to draw such combustible mixture into the burner. Also, the igniter will not heat up since this igniter is ordinarily connected to the automobile battery through the engine ignition switch and this switch is open while the engine is not operating. As soon as the engine is started, however, my pre-heating unit will begin to function without any manipulation of the manual control button 76.

When it is desired that my pre-heating unit operate automatically whenever the engine is operating and the water in the engine jacket is below the desired temperature for efficient operation of the heating unit 56, the control button 76 may be left in the on position. Whenever it is desired to cut out the automatic operation of my pre-heating unit, this control button can be pushed inwardly to its off position. This will raise the valve 154 to close communication between the two parts of bore 146 and thus cut off the supply of combustible mixture to the burner. Raising of the valve 154 will also open the igniter switch and cut off the supply of current for the igniter 166.

In the embodiment of Figs. 8 to 15, inclusive, I have shown my pre-heating apparatus applied in a somewhat different manner to the hot water heater of a conventional automobile. In this form of my invention, I have shown in Fig. 8 an automobile engine 250 provided with the usual water jacket connected to the radiator 252 by hose connection 254. A return pipe 256 connects the bottom of the radiator with the water pump 258 which returns the water to the engine water jacket through hose connection 260.

The engine 250 is provided with an air intake 262 leading to the carburetor 264 attached to the intake manifold 266. A hot water heating unit 268 is attached to the dash 270 by pipe 272 and a second pipe 274 connects the upper part of the heating unit 268 with the radiator return pipe 256 leading to the water pump 258. Hot water from the engine water jacket is supplied to the heating unit by way of pipe 276, whose inlet end is attached to the top of the engine water jacket. My new and improved pre-heating apparatus is interposed between the pipe 276 and the inlet connection of the heating unit 268. The parts thus far described are conventional and in the usual arrangement the pipe 276 would lead directly to the inlet of the heating unit 268.

Figure 8:
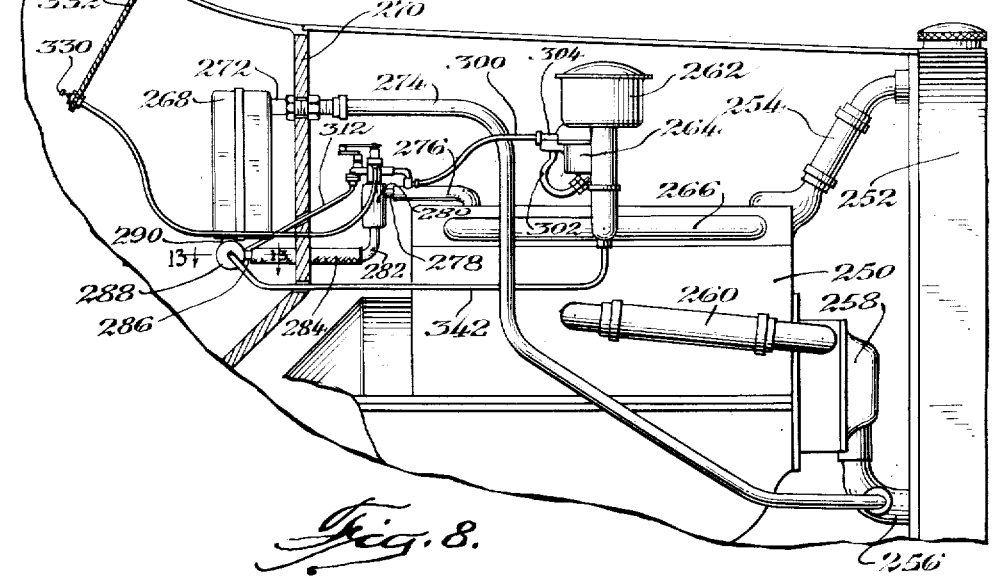
Fig. 8 is a view similar to Fig. 1 but showing a different installation of my invention on a conventional automobile.

As best shown in Fig. 8, the pipe 276 connects the water jacket of the engine with the inlet 278 of the control chamber 280. The outlet pipe 282 of the control chamber 280 is connected by flexible hose 284 to the inlet 286 of burner 288. This burner has an outlet 290 which is connected to the inlet of the heating unit 268. The control chamber 280 is shown in side, top, and end elevational views in Figs. 9, 10, and 11, and may be identical in construction with the control chamber 70 of the embodiment of Figs. 1 to 7, inclusive.

The control head 292 is attached to the top of the control chamber 280, and is connected by elbow 294 with carburetor 296. This carburetor has a fuel inlet nipple 298 which receives fuel from the float bowl of the engine carburetor 264 by way of pipes 300 and 302. A gas pickup 304 is illustrated as being interposed between the pipes 300 and 302, and functions to mix a small amount of air with the fuel passing to the burner carburetor 296. A similar gas pickup is indicated in Fig. 1, but these pickups may be dispensed with if desired.

The combustible mixture provided by the burner carburetor 298 flows through the control head 292 and its integral arm 306 to a pipe 312 connected to the arm 306 by fitting 308 and nut 310. As best shown in Figs. 13 and 15, the other end of the pipe 312 is connected by means of tubular nut 314 and fitting 316 to burner head 318. This pipe 312 conducts a combustible mixture to the burner tube 320 located in combustion chamber 322.

It will be understood that the control head 292 is identical with the control head 110 of the previous embodiment, and has the same control means therein for regulating the supply of combustible mixture to the burner. The control head 292 and control chamber 280 also provide automatic means for controlling the igniter switch 324 which may be identical with the igniter switch of the previous embodiment and automatically and manually controlled in the same manner. The manual control for this switch is through cable 326 and is best shown in Figs. 11 and 12.

In Fig. 11, manual control is in the on position. The burner switch is in circuit closing position and the valve means in the control head 292 is positioned to admit combustible mixture to the burner 288. In Fig. 12, the manual control is in the off position and the switch contacts are separated and no combustible mixture can flow to the burner. The cable 326 passes through flexible conduit 328 and is connected to control button 330 adjacent the dash 332 of the automobile.

The manual and automatic controls for my pre-heating apparatus of Figs. 8 to 15, inclusive, are identical with the manual and automatic controls of the previous embodiment of my invention, and need no further description at this time. In the embodiment of Fig. 8, however, the control chamber 280 and burner 288 are separated, and the latter is located in a horizontal position beneath the heating unit, whereas in Fig. 1, the control chamber and burner are attached to each other and both are upright.

The burner 288 is best shown in Fig. 13 and may be identical with the burner 66 of the previous embodiment. This burner 288 has an igniter 334 controlled by the switch 324, and is provided with a flame arrestor and diffuser 336 carried on a supporting tube 338 having openings 340 communicating with pipe 342 leading to intake manifold 266. Inner and outer walls 344 and 346, respectively, provide a water jacket 348 through which the water passes as it travels between the burner inlet 288 and the burner outlet 290. The fact that the burner 288 is placed upon its side beneath the heating unit 268, requires no change in the burner or its associated parts, and this burner may be identical in every respect with the burner 66 of the previous embodiment.

In the embodiment of Fig. 1, the control chamber 70 and burner 68 constitute an accessory unit which is interposed between the pipe 64 connected to the top of the engine water jacket and the pipe 62 leading to the heating unit 56. Such an accessory unit, with its associated control mechanism, constitutes a convenient apparatus which can be readily applied to many conventional hot water heater installations without appreciable change in the installation. In some heater installations, however, there is no available space for such an accessory unit, and other arrangements have to be made for accommodating my pre-heating apparatus. The arrangement shown in Fig. 8 is one way of accommodating my pre-heating apparatus to a type of hot water heater installation which is not capable of accommodating the accessory unit shown in Fig. 1.

In the arrangement of Fig. 8, the burner 288 is located on its side and placed immediately beneath the heating unit 268. The control chamber 280, however, is left in the engine compartment, and is illustrated as being connected to the burner 288 by means of pipe 282 and flexible hose 284, which passes through a suitable opening formed in the dash 270. In this arrangement, the pipe 312, which supplies combustible mixture to the burner 288, also passes through the dash 270. This means that the carburetor 296 is located on the engine side of the dash 270 and the combustible mixture is always traveling through a completely closed path after it passes to the passenger side of the dash 270.

The arrangements of Fig. 1 and Fig. 8 are merely two of various arrangements which might be effected by different positioning of the control chamber and burner. The control mechanism is attached to the control chamber, and any desired arrangement of control chamber and burner may be easily effected without interfering with the essential relationship between the various elements of the control mechanism. While in both Figs. 1 and 8 I have shown the control chamber as being vertically arranged, such arrangement is not essential, and the control chamber may be located on its side or at an angle or in any other position which may be dictated by space conditions.

In Figs. 16, 17, 18, and 19, I have illustrated my invention as being embodied in apparatus including a pre-heater type of heating unit. Such a unit is indicated generally by reference numeral 350 and comprises a lower tank 352, an upper tank 354, and vertical tubes 356 connecting tanks 352 and 354. Spaced fins 358 of sheet metal and preferably formed of relatively high heat conducting material, surround the tubes 356 and conduct heat therefrom to the air which passes between these tubes and between the fins.

The heating unit 350 is provided with an electric motor 360 which drives a fan 362 for blowing air over the tubes and fins and for directing this air into the passenger compartment or other space to be heated. It will be understood that the heating unit as thus far described may be of any conventional or desired type, and that this heating unit would ordinarily be enclosed in a casing. The casing is usually provided with an adjustable louvre for directing the heated air in selected directions.

In the pre-heating heater unit 350, my novel burner 364 is located in the tank 352. This burner 364 may be identical with the burners previously described except that the outer wall 366 of the burner 364 is made somewhat larger and shaped, as most clearly shown in Fig. 17, to form the casing for the lower tank 352. This outer wall 366 has an inlet 368 connected by a pipe 370 to the control chamber 372, which is illustrated as being located in a horizontal position and placed closely adjacent to the burner and lower tank 352. The tubes 356 constitute the outlet pipes for the water jacket 374 formed between the inner wall 376 of the burner 364 and the outer wall 366 thereof.

As more clearly shown in Figs. 18 and 19, the burner and control chamber in this embodiment of my invention are connected directly to each other in the same way in which the burner and control chamber of the embodiment of Figs. 1 to 7 are attached to each other. The control chamber is provided with the control head 378 having a laterally extending arm 380 which is attached to the burner head 382. The head 382 is provided with a burner tube 383, which is connected by way of the passages in the burner control head 378 and its arm 380 with elbow 384 and carburetor 486. The carburetor has an inlet 388 through which air is admitted and a nipplet 390, which is connected through suitable tubing with the carburetor float bowl or any other suitable source of gasoline or other available fuel.

A switch supporting block 392 is mounted on arm 380 and carries switch 394, which controls the supply of current to the igniter 396. The pre-heating apparatus of Figs. 16 to 18, inclusive, is provided with the same manual and automatic controls utilized in the previous embodiments, and further explanation of these controls is therefore unnecessary. The manual control may be effected through a Bowden wire or any other remote control mechanism.

The control chamber 372 has a water inlet 398, which is adapted to be connected through suitable piping with the top of the engine water jacket, and the heating unit 350 has an outlet 400 adapted to be connected by a pipe 402 to the inlet of the engine water pump. The burned gases discharged by the burner 364 flow through a pipe 404 to the engine intake manifold which provides the suction necessary to suck air and fuel into the burner carburetor 386 and draw the combustible mixture there formed into the burner combustion chamber 406.

In Figs. 16 to 19 inclusive, I have illustrated an embodiment of my invention wherein the burner is located in one of the water compartments of the heating unit and the control chamber is attached directly to this burner and is placed immediately adjacent thereto. Such an arrangement is desirable, but is in no wise essential and in some installations, it will be impossible or inadvisable to place the control chamber in such close proximity to the heating unit. In these latter installations, the control chamber can be located at a point remote from the burner and connected to the burner by piping in a manner similar to that disclosed in the embodiment of Figs. 8 to 15, inclusive.

The pre-heating unit 350 is illustrated as being a heater having upper and lower tanks and vertically arranged tubes connecting these tanks. Such a type of heater is common, but it is also common to provide a heating unit wherein the tanks are arranged at opposite ends of the heater and the connecting tubes extend horizontally between these tanks. Various other arrangements of tanks and connecting tubes are commonly found in heating units, and I want it to be understood that my invention is not limited to the particular style of heating unit shown in Figs. 16 to 18, inclusive, but that my pre-heating apparatus may be applied to or built into heating units having different arrangements of tanks and connecting tubes.

Figure 20:
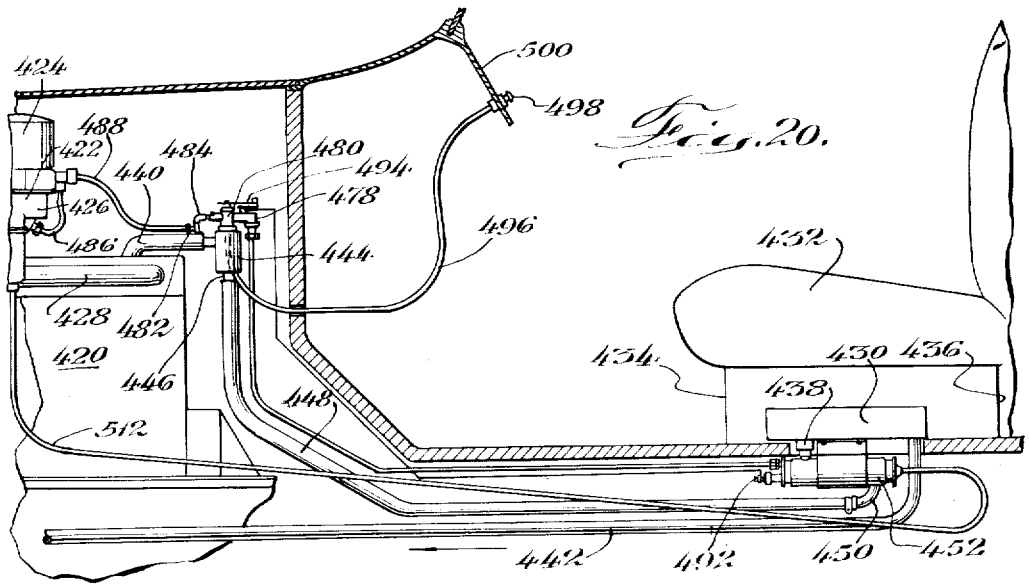
Fig. 20 illustrates a further form of my invention as being applied to a conventional automobile.
Figure 21:
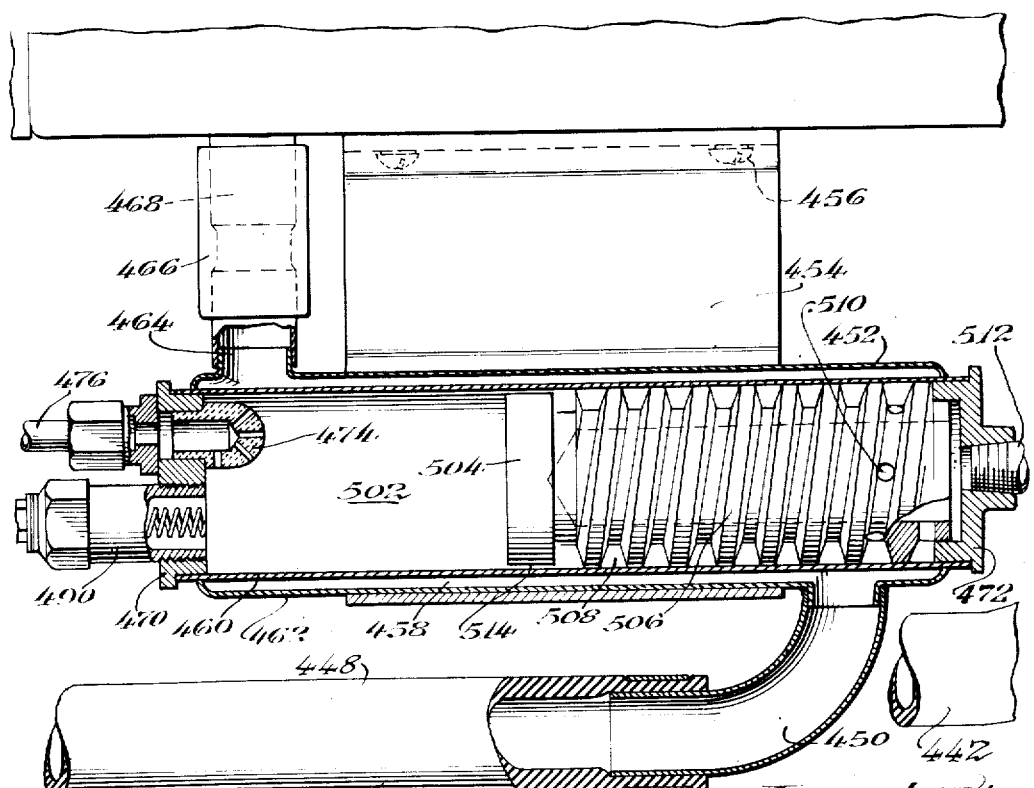
Fig. 21 is a longitudinal, vertical sectional view through the burner and associated parts of Fig. 20.

During the past several years it has become increasingly common to mount a heating unit beneath the front seat of an automobile in such a manner that this heating unit will supply heat to both the front and rear compartments of the conventional passenger automobile intended to accommodate five or six people. In Figs. 20 and 21, I have illustrated an installation wherein my new and improved pre-heating apparatus is applied to an automobile having a hot water heater located beneath the front seat. The particular arrangement of the parts illustrated has been selected by way of example only and various modifications of this arrangement are present on different makes of automobiles.

In Fig. 20, I have illustrated an automobile having engine 420 provided with water jacket which is connected to the usual radiator by a piping arrangement similar to that shown in Figs. 1 and 2. It will be understood that the usual water pump is provided to circulate the water through the engine water jacket and the automobile radiator. The engine 420 has a carburetor 422 illustrated as being provided with an air cleaner 424 through which the carburetor receives the necessary quantity of air to be mixed with gasoline obtained from a float bowl 426 which is connected with the main gasoline tank through conventional piping. The carburetor 422 supplies a combustible mixture to the engine intake manifold 428 which may be of any usual or desired design.

The heating unit 430 is illustrated as being located beneath the front seat 432 and openings 434 and 436 are provided to permit the heated air discharged by the heater 430 to pass to both the front and rear portions of the passenger compartment of the automobile. The heating unit 430 may be of any usual or conventional type and ordinarily includes an electrically driven fan for circulating air over the heating unit and forcing it into the passenger compartment of the vehicle. In the conventional installation, the inlet 438 to heating unit 430 would be connected by piping to the pipe 440 attached to the head of the engine 420. A return pipe 442 conducts water from the heating unit 430 to the intake of the engine circulating pump so that the operation of this pump creates a circulation through the heating unit 430 as well as through the automobile radiator.

In the arrangement shown in Fig. 20, the pipe 440 attached to the head of the engine conducts hot water from the engine water jacket to the control chamber 444 which is illustrated as being mounted adjacent the engine and connected thereto by a relatively short pipe. The control chamber 444 is not, however, necessarily mounted in such close proximity to the engine 420 and may be placed in any desirable and available position.

The outlet 446 of the control chamber 444 is connected by pipe 448 to the inlet 450 of burner 452. A sheet metal support 454 is attached by screws 456 or any other suitable means to the heating unit 430 and holds the burner 452 in a horizontal position just below this heating unit. This forms a convenient and desirable arrangement for supporting the burner 452 and has the advantage of reducing the length of the pipe which connects the burner with the heating unit so that little heat is lost by the water in passing from the burner 452 to the heating unit 430. However, the particular arrangement of the burner shown in Figs. 20 and 21 is not always possible or desirable and in some installations the burner will be otherwise located.

The burner inlet 450 conducts the water to a water jacket 458 located between inner and outer walls 460 and 462, respectively. The water jacket 458 has an outlet 464 connected by a short piece of flexible hose 466 to the inlet 468 for the heating unit 430. The ends of outer wall 462 are bent inwardly as clearly indicated in Fig. 21 and sealed against the exterior surface of the inner wall 460 to seal the ends of the water jacket 458. The ends of the inner wall 460 are closed by heads 470 and 472. The head 470 carries the burner tube 474 which is supplied with combustible mixture through pipe 476 connected to the arm 478 of the control chamber 444. Burner carburetor 482 is connected to the control head 480 through elbow 484 and fuel is supplied to the carburetor 482 from the float bowl of the engine carburetor 422 by way of pipes 486 and 488.

Igniter 490 is mounted in burner head 470 and is connected by a lead 492 with the burner control switch 494 mounted on the control head 480. The control chamber 444 and its associated control mechanism is identical with that previously described, and needs no further description at this point. Manual control is effected through a Bowden wire 496 terminating in a control button 498 mounted on dash 500.

The combustible mixture flowing into the combustion chamber 502 through burner tube 414 is ignited by the igniter 490 and burns to produce heat which is transmitted to the water in the water jacket 458. The combustion chamber 502 is located between the burner head 470 and the cylindrical end 504 of a ceramic or other refractory plug 506 which is located in the righthand end of the burner. This plug has a helical groove 508 through which the burned gases must flow in passing from the combustion chamber 502 to the ports 510 which connect the groove 508 with the interior of the hollow plug 506 and the pipe 512 through which the burned gases pass to the intake manifold.

The cylindrical head 504 is of slightly smaller diameter than the inner wall 460 of the burner and provides a narrow annular passage 514 therebetween. In flowing through this passage 514, the gases are brought into intimate contact with the adjacent part of the wall 460 and in continuing their travel through the helical groove 508, these gases remain in intimate contact with the wall 460 and readily give up their heat thereto. The plug 506 thus forms an efficient baffle for bringing the burned gases into intimate contact with the inner wall of the water jacket and promotes efficient operation of the burner.

The plug 506 of Fig. 21 is illustrated as having a single helical groove 508. In lieu of a single groove, a plurality of parallel helical grooves can be used and the particular number of grooves selected and the length and cross-section of these grooves or groove may be varied for different conditions of operation. This plug 506 is interchangeable with the tubular support 222 and ceramic heat retainer and diffuser 224 of the first embodiment and with the similar structures used in the burners of the second and third forms of my invention and may be used in lieu thereof in any of the burners shown.

Figure 22:
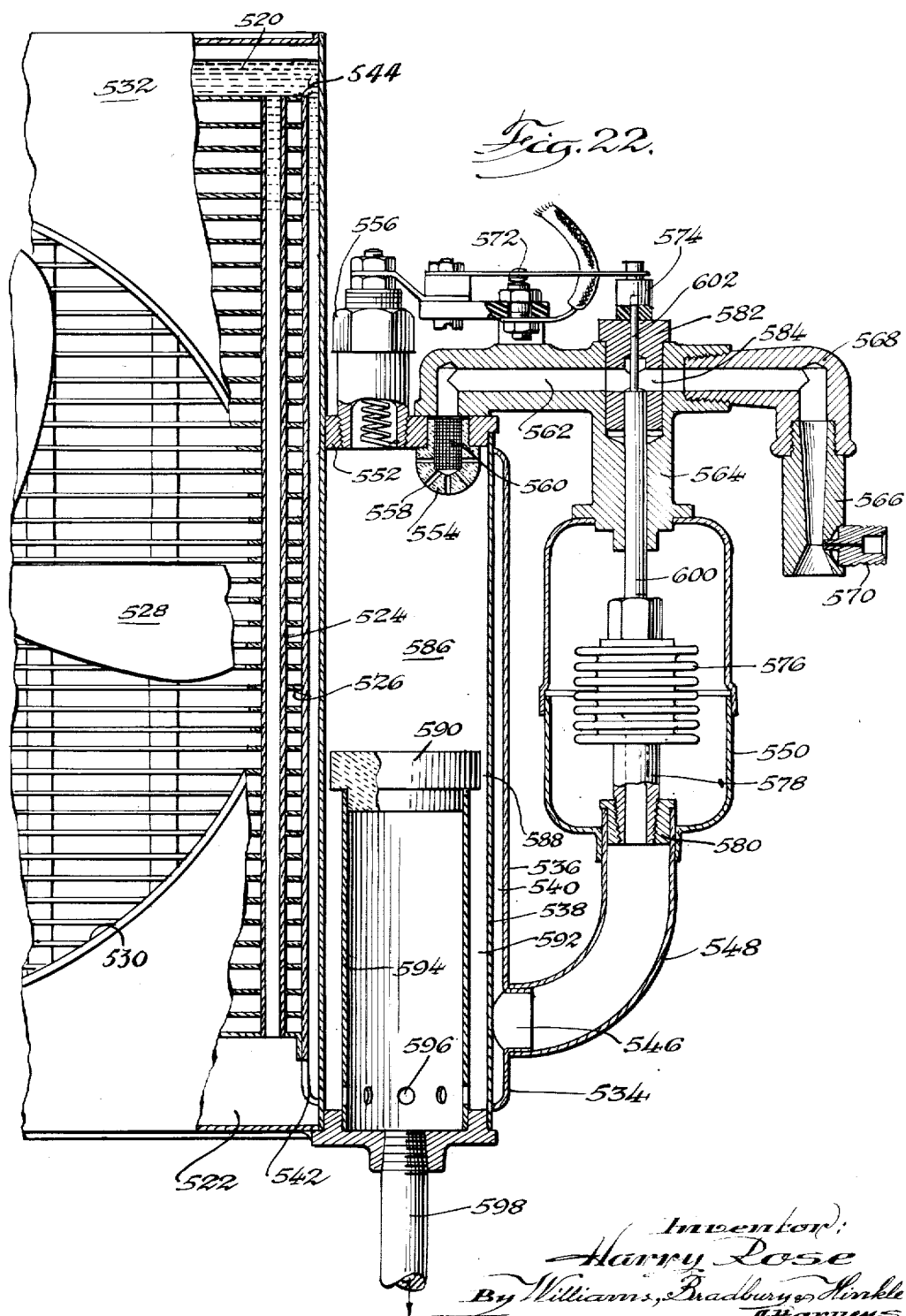
Fig. 22 is a view largely in section showing a unit heater embodying features of my invention.

In the preceding embodiments, the heating units have been designed for connection with the cooling system of the automobile engine and in such arrangements the heat supplied to the water in the engine cooling system is ordinarily utilized to supply heat to the heating units. In those installations, my pre-heating apparatus was intended to operate only when the temperature of the water in the engine water jacket was insufficient to meet the requirements of the heating units. In Fig. 22, however, I have provided a heating unit which is not dependent upon the cooling system of the automobile engine for heat but is entirely independent of this cooling system.

The heating unit of Fig. 22 has an upper tank 520, a lower tank 522, and water tubes 524 connecting these tanks. Spaced fins 526 surround the tubes 524 and receive heat therefrom. A fan 528 circulates air over the tubes 524 and fins 526 which transmit heat to this air. The fan 528 is ordinarily driven by an electrical motor of any conventional type and directs the heated air through an outlet 530 in the casing 532 which encloses the tanks 520 and 522, the tubes 524 and fins 526. If desired, the casing outlet 530 may be provided with an adjustable cover having louvres for directing the heated air in different directions depending upon the selected adjustment of the cover.

A burner 534 is provided to supply heated water to the tubes 524. This burner comprises outer and inner walls 536 and 538, respectively, providing a water jacket 540 therebetween. The lower end of the water jacket communicates through openings 542 with the lower tank 522 and the upper end of the water jacket 540 communicates through openings 544 with the upper tank 520. The water jacket 540 is also provided with a nipple 546 connected to a pipe 548 leading to the lower end of a pressure control chamber 550 provided for a purpose which I shall presently describe.

The upper end of the burner is closed by a head 552 carrying a burner tube 554 and an igniter 556. The burner tube 554 has openings 558 communicating through a frame arrestor 560 with the passage 562 in control head 564. A combustible mixture is supplied to the passage 562 by a carburetor 566 connected to the control head 564 through elbow 568. Gasoline or other fuel is supplied to the carburetor 566 through a nipple 570 which may be connected by a pipe to any suitable source of fuel. Where this heater is used in an automobile, bus, or similar vehicle, the carburetor 566 will ordinarily be supplied with fuel from either the float bowl of the engine carburetor or from the main fuel tank of the vehicle although a separate fuel tank may, if desired, be supplied for the heater alone.

The igniter 556 is ordinarily connected with the automobile battery, but such an arrangement is not necessary or essential and a separate battery or other source of current may be provided for the heater. The connection between the igniter 556 and its source of current is through a control switch 572 which is mounted on the control head 564. The switch 572 is opened by raising a control block 574 which may be raised by either a manual or automatic control.

The control chamber 550 has a pressure bellows or Sylphon 576 located therein and supported at its lower end on a tube 578 threaded into a ferrule 580 located in the upper end of pipe 548. The interior of the bellows 576 is in open communication with the water jacket 540 through tube 578 and pipe 548 so that any pressure created in the water jacket 540 is transmitted to the interior of the bellows 576.

The heater shown in Fig. 22 is intended to be manually controlled under normal conditions and such manual control is effected by raising and lowering the valve plug 582 slidably mounted in the control head 564. When the valve plug 582 is raised, the port 584 therein is moved out of alignment with the passage 562 and this passage is closed by the lower end of plug 582 to shut off the supply of combustible mixture to the burner. Raising valve plug 582 also raises switch control plug 574 and opens switch 572 to cut off the current supply of igniter 556.

When the valve plug 582 is again lowered, communication is established between the burner and its carburetor 566 so that a combustible mixture can be drawn into the burner by suction existing therein. Switch 572 is also closed to permit current to be supplied to the igniter 556. This position of the parts is shown in Fig. 22. Any suitable manual control may be provided for raising and lowering the valve plug 582. Such a manual control may take the form of a Bowden wire attached to the upper part of the plug 582 in the manner illustrated and described in connection with the other embodiments shown and described in this application.

The combustible mixture admitted to the combination chamber 586 through burner tube 554 is ignited by igniter 556 and the burned gases flow through the annular passage 588 formed between the ceramic heat retainer and diffuser 590 and inner wall 538 and then pass through the annular space 592 formed between inner wall 538 and supporting tube 594. The burned gases give up their heat to the water in the water jacket 540 and leave the burner through port 506 which connects the space 592 with exhaust pipe 598. This exhaust pipe may be connected with the intake manifold of the engine or with any other suitable source of suction.

If the water in the water jacket 540 should be heated to too high a temperature, steam will be formed and a pressure will be built up in this water jacket, tanks 520 and 522, and tubes 524. Unless some means were provided to limit the pressure which could be thus produced, an explosion might result. A feature of my invention lies in the provision of automatic control means for limiting the pressure which can be created in the water jacket 540 and connected parts. This control means comprises the control chamber 550 and related mechanisms.

Any pressure created in the water jacket 540 is transmitted to the bellows 576 through pipe 548 and tube 578. When this pressure reaches a predetermined maximum limit, bellows 576 expands and raises control rod 600 and pin 602 mounted on the end of, or integral with, control rod 600. When control rod 600 is raised, the upper end of this rod closes port 584 and cuts off the supply of combustible mixture to the burner. At the same time, pin 602 lifts switch control plug 574 and opens switch 572 to cut off the supply of current to the igniter 556.

The foregoing operation of the control mechanism puts the burner out of operation. When the temperature of the fluid in the heater has cooled down sufficiently to relieve the pressure therein, bellows 576 contracts and returns the control mechanism to the position shown in Fig. 22. Combustible mixture is again supplied to the burner and this combustible mixture is ignited by igniter 556 which is again connected with its source of current. In a properly designed heater, all control is normally manual and operation of the pressure control would usually occur only in case of failure of the fan 528 or because of insufficient water in the heater or some other abnormal condition. This control mechanism, however, is simple and effective and prevents accidents resulting from the creation of abnormal pressure in the heater.

In the normal operation of the heater of Fig. 22, the water in the water jacket 540 is heated by the burner. This causes an upward circulation in water jacket 540 and hot water from the top of this jacket flows into tank 520 and thence downwardly through tubes 524. As the hot water flows downwardly in these tubes, it gives up its heat and this heat is transferred to the air flowing over the fins and tubes under the force created by the fan 528. The cooled water discharged from the lower ends of the tubes 524 passes into lower tank 522 and thence through openings 542 into the lower end of water jacket 540.

The foregoing circulation of the water in the heater continues as long as the heater operates under normal conditions. In case the fan 528 should stop, or the water in the heater should drop below the openings 544, the water in the water jacket 540 might be raised to boiling temperature and create sufficient pressure to operate the automatic pressure control mechanism to cut out the burner.

Heaters of the kind shown in Fig. 22, are independent of the engine cooling system and may be located anywhere in or about the passenger space of an automobile, bus, or other vehicle. In some instances, it may be desirable to provide several of these heaters located at different points in the passenger space so that a substantially uniform temperature is maintained throughout this space. Where uniformity of temperature is not essential, a single heater may be made of sufficient capacity to heat the entire space, regardless of its size.

The heater of Fig. 22, like the other embodiments of my invention, is effective to supply heat to the passenger compartment of the vehicle with a minimum of delay after the manual control has been moved to the on position. This feature of my invention is particularly advantageous where the vehicle is used for short runs and is left standing in the cold between these runs so that the medium in the heater and parts connected therewith is cooled between runs. Because of the automatic pressure control provided for the heater in Fig. 22, the liquid tanks 520 and 522 may be of minimum capacity and thus facilitate the quick, effective operation of the heater whenever heat is called for by the controls. In the other forms of my invention, the reduced flow through the heating unit and burner while the latter is in operation, contributes to reducing the time required to bring the heating unit up to full operating temperature.

In describing my invention, I have referred to the heaters as hot water heaters and the cooling medium of the automobile cooling system as water since these are the terms most commonly used in the art. In winter, however, such cooling medium is ordinarily a mixture of water and alcohol, water and glycerine, water and some other antifreeze. In some instances, kerosene, or some other non-freezing liquid may be used exclusively. My invention is not limited to the use of water, but may be used with any other suitable medium and the term water where used herein is to be construed as covering any such medium.

It is to be understood that my invention is not limited to the details illustrated and described, but may assume numerous other forms coming within the scope of the appended claims which define the limits of my invention.

I claim:

1. In heating apparatus of the class described, the combination of a heating unit for an automobile and comprising radiating means and means for circulating air over said radiating means, a burner for supplying hot water to said heating unit, a water jacket for said burner, an igniter for igniting a combustible mixture in said burner, means for supplying a combustible mixture to said burner, a valve for controlling the flow of water through said water jacket, a second valve for controlling the flow of combustible mixture to said burner, a switch for controlling communication between said igniter and a source of electrical current, a single temperature responsive bellows for actuating said valves and switch, said bellows being located between said valves, a fixed support for one end of said bellows, and means for connecting said valves and switch with the other end of said bellows, said last named means including a frame enclosing said bellows.

2. In heating apparatus of the class described, the combination of a burner, a water jacket for said burner, said water jacket having an outlet adapted to communicate with a heating unit, said jacket having a water inlet, a control chamber communicating with said inlet, a valve for controlling the flow of water between said control chamber and jacket, a bellows in said chamber, said bellows being located between said water inlet and said valve, a rigid support for the lower end of said bellows, an open frame having a part mounted on the upper end of said bellows, said frame being connected to said valve means, a conduit for supplying a combustible mixture to said burner, an igniter for said burner, a switch through which electrical energy is supplied to said igniter, and a control member attached to said frame for closing said passage and opening said switch under the influence of said bellows.

3. In heating apparatus of the class described, the combination of a burner having a water jacket adapted to supply hot water to a heating unit, a control chamber through which water is supplied to said jacket, said chamber having an inlet adapted to be connected to a water cooling system of an internal combustion engine, a temperature responsive element in said chamber, valve means operated by said element to regulate the flow of water between said chamber and jacket, a conduit for supplying combustible mixture to said burner, an igniter for said burner, a switch through which current is supplied to said igniter, means operated by said element to close said conduit and open said switch, and a separate manual control for said switch and conduit.

4. In heating apparatus adapted to be interposed between the internal combustion engine and a radiator supplied with hot water therefrom, the combination of a boiler connected to said radiator and engine, a burner for heating water in said boiler, means for supplying a combustible mixture to said burner, an igniter for said mixture, a switch through which electrical current is supplied to said igniter, said switch including a flexible blade carrying an electrical contact, stationary means carrying a cooperating contact, a movable block adjacent one end of said blade, means for moving said block to flex said blade and open said switch, a thermostatic control responsive to the temperature of the water at said boiler inlet for actuating said means, a cable passing through an opening in said switch blade, a spring confined between one end of said cable and said blade, and a manually operated control button attached to said cable for opening said switch.

5. Heating apparatus adapted to be connected in a heating system, comprising a radiator supplied with hot water from the cooling system of an internal combustion engine, said heating apparatus including a container adapted to receive water from the internal combustion engine, said container having an inlet and an outlet, a boiler connected to said outlet and adapted for connection to said radiator, a burner for heating water in said boiler, a control head attached to said container, said control head having a passage therethrough, means for supplying a combustible mixture to said burner through said passage, a valve plug located in said passage and having a port constituting a continuation thereof, a member slidable in said plug to close said port, a temperature responsive element in said container for operating said slidable member, a valve controlling water flow through said container and boiler, said valve being connected to and operated by said temperature responsive element, and manual means for moving said plug to shift said port out of registry with said passage.

6. Heating apparatus for supplying hot water to a heating having a radiator and fan for circulating air over such radiator, such apparatus comprising a boiler communicating with said radiator, a container having one end connected to said boiler, a burner for said boiler, a head attached to the other end of said container and providing a passage through which combustible mixture is supplied to said burner, a valve plug in said passage, said plug having a port adapted to constitute a continuation of said passage, a bore in said plug extending transversely of said port, a smaller bore constituting a continuation of said first mentioned bore, a member having a large part located in said large bore and a smaller part located in said smaller bore, switch means adjacent said plug and operable in response to movement of said member, means for shifting said member to close said port and operate said switch means, and means for moving said plug to close said passage and operate said switch means.

7. Heating apparatus of the class described comprising a boiler adapted to be connected to a radiator, a burner for supplying heat to said boiler, said boiler having a gas outlet adapted to be connected to a source of suction, a container connected at one end to said boiler, said container and boiler being substantially cylindrical and arranged side by side, a head for said container having a part attached to said boiler and providing a passage communicating with said burner, means for supplying a combustible mixture to said passage, an igniter plug for said burner, a switch mounted on said head and controlling flow of current to said igniter plug, a single bellows in said container, said bellows having a fixed end, a rod attached adjacent the connection between said container and boiler, said bellows having a movable end, a rod attached to said movable end, said head having a rod receiving bore intersecting said passage, said rod having a part adapted to close said passage under the influence of said bellows, and a pin interposed between said rod and switch whereby said switch is operated by said bellows.

8. In combination, heater means including a burner and a container for a medium to be heated, heat transfer means, means connecting said container to said heat transfer means, a control head having a passage therethrough, means connecting said passage to said burner, means for supplying a combustible mixture to said burner through said passage, a valve in said head adapted to interrupt flow through said passage when shifted in one direction, manual means for shifting said valve, a second valve disposed within the first valve and adapted independently to interrupt the flow through said passage, and a thermostatic element responsive to the temperature of said medium to be heated for operating the last said valve.

HARRY ROSE.

REFERENCES CITED

The following references are of record in the file of this patent:

UNITED STATES PATENTS

| Number | Name | Date |
|---|---|---|
| 920,982 | Mracek | May 11, 1909 |
| 1,316,021 | Doble | Sept. 16, 1919 |
| 1,632,125 | French et al. | June 14, 1927 |
| 1,739,114 | Baker | Dec. 10, 1929 |
| 1,772,597 | Trinkle | Aug. 12, 1930 |
| 1,992,789 | Veale | Mar. 2, 1937 |
| 2,072,763 | Mayo | Mar. 2, 1937 |
| 2,135,275 | Cannon | Nov. 1, 1938 |
| 2,138,941 | Roudanez | Dec. 6, 1938 |
| 2,162,571 | Bock | June 13, 1939 |
| 2,235,692 | Timmis | Mar. 18, 1941 |
| 2,249,946 | Darrah | July 22, 1941 |
| 2,254,801 | George | Sept. 2, 1941 |
| 2,270,824 | Meyerhoefer | Jan. 20, 1942 |
| 2,286,853 | Holthouse | June 16, 1942 |
| 2,289,208 | Pinkerton et al. | July 7, 1942 |
| 2,296,185 | Rose | Sept. 15, 1942 |
| 2,300,010 | Rose | Oct. 27, 1942 |
| 2,300,011 | Rose | Oct. 27, 1942 |

Certificate of Correction

Patent No. 2,463,908.

March 8, 1949.

HARRY ROSE

It is hereby certified that errors appear in the printed specification of the above numbered patent requiring correction as follows:

Column 4, line 68, for the word "burner" read *heater*; column 12, line 39, for "nipplet" read *nipple*; column 16, lines 49 and 50, for "combination" read *combustion*; line 58, for "port 506" read *port 596*; column 19, line 54, for "heating" read *heater*; and that the said Letters Patent should be read with these corrections therein that the same may conform to the record of the case in the Patent Office.

Signed and sealed this 23rd day of August, A. D. 1949.

[SEAL]

THOMAS F. MURPHY,
*Assistant Commissioner of Patents.*